Feb. 25, 1941.  E. R. MAURER  2,232,796
POWER TRANSMISSION
Filed Dec. 2, 1936   3 Sheets-Sheet 1
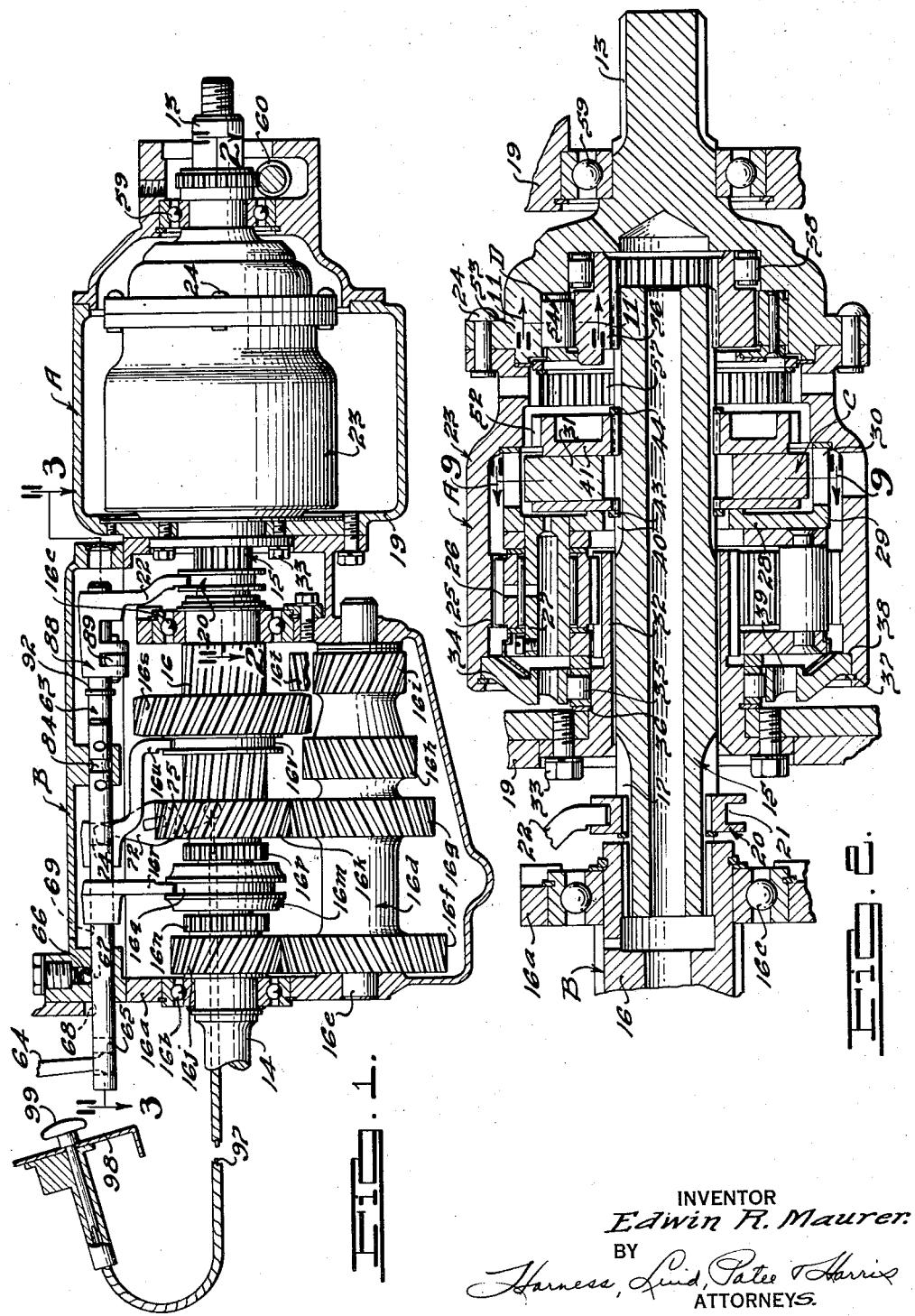
INVENTOR
Edwin R. Maurer.
BY
Harness, Lind, Pates & Harris
ATTORNEYS.

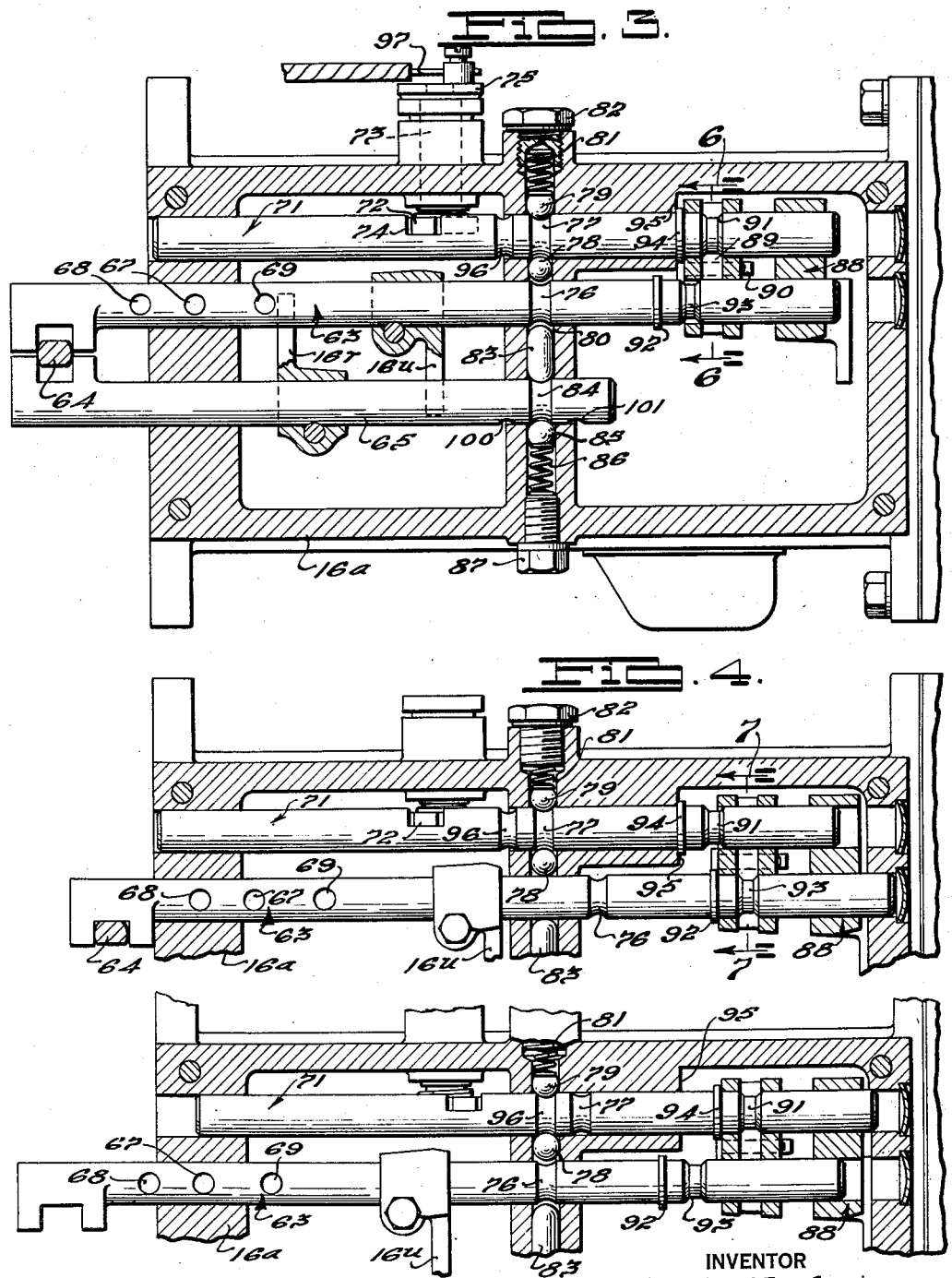

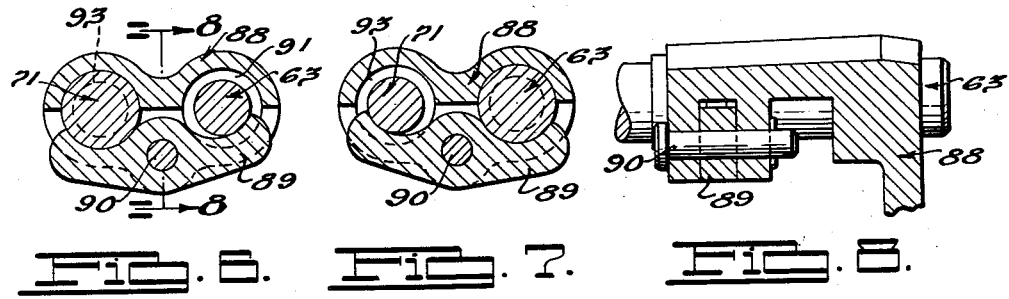
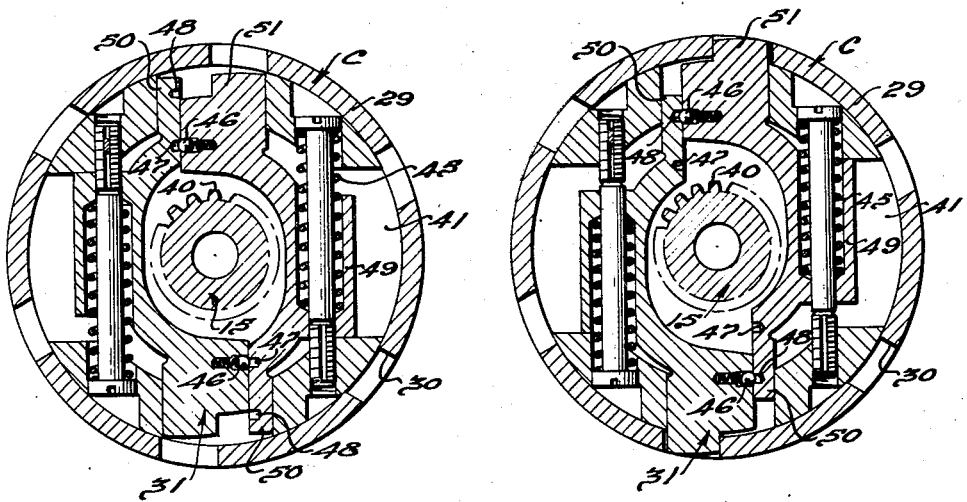
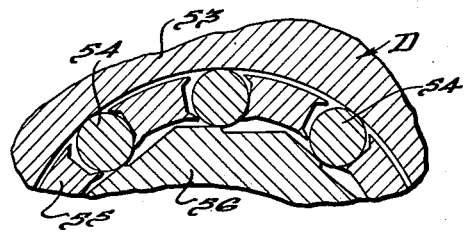

Patented Feb. 25, 1941

2,232,796

UNITED STATES PATENT OFFICE 2,232,796

POWER TRANSMISSION

Edwin R. Maurer, Detroit, Mich., assignor to Chrysler Corporation, Highland Park, Mich., a corporation of Delaware Application December 2, 1936, Serial No. 113,772

8 Claims. (Cl. 74—328)

This invention relates to driving mechanisms and refers more particularly, in one embodiment thereof, to improvements in driving mechanisms for motor cars or vehicles, especially where it is desired to vary the driving speed ratio between the vehicle engine or prime mover and the propelling ground wheels.

One object of my invention resides in the provision of an improved driving mechanism adapted, under predetermined desired conditions, to automatically effect the drive for the vehicle. My driving mechanism is preferably adapted for use in connection with a speed ratio changing transmission and is adapted to establish an auxiliary driving speed ratio for the vehicle, such as an overdrive ratio, for example.

A further object of my invention resides in the provision of an improved driving or speed ratio changing mechanism adapted to automatically respond in its actuation to predetermined desired operating conditions of the vehicle. Thus, by way of example, I have provided an overdrive which is automatically effective in an improved manner when the vehicle attains a predetermined speed so that on reaching this critical speed, the overdrive becomes effective and on falling below this critical speed the overdrive becomes ineffective.

Further objects of my invention are to provide means to simplify and lessen the manufacturing cost of the driving mechanism commensurate with the improvements obtained by my invention, and to simplify and improve the alignment of parts of the driving mechanism.

Other objects of my invention are to provide improvements in the controls of the overdriving mechanism. This mechanism, according to the present embodiment of my invention, includes an overrunning clutch for permitting synchronization in the speeds of the operating structures of an automatic centrifugal clutch for effecting an automatic control of the overdrive gear train in a manner which is smooth and positive in its operative response to motor vehicle driving speeds. It is desirable to provide manually controlled mechanism for locking out the overrunning clutch and my invention provides improvements in the manual control of this clutch.

Furthermore, my invention has among its objects to provide improved controlling mechanism for the automatic clutch and the overrunning clutch, such mechanism being easily shifted and protected in an improved manner against operations tending to damage the parts of the mechanism; to provide an improved manual control for the overrunning clutch combined with a reverse control mechanism and selectively operable independently thereof; and to provide improvements in the drive between the manually operable control clutch and the overdrive automatic and overrunning clutches whereby the operation of the manual clutch is facilitated.

Further objects and advantages of my invention will be more apparent from the following illustrative embodiment of the principles of my invention, reference being had to the accompanying drawings, in which:

Fig. 1 is a sectional elevational view through the driving mechanism including the transmission and overdrive mechanism.

Fig. 2 is a sectional top plan view of the overdriving mechanism, the view being taken as indicated by the line 2—2 of Fig. 1.

Fig. 3 is a sectional top plan view of the manual control mechanism taken as indicated by the line 3—3 of Fig. 1.

Fig. 4 is a view similar to Fig. 3 but showing the manual control mechanism in its position for effecting a reverse drive for the driving mechanism.

Fig. 5 is a view similar to Figs. 3, 4 but showing the manual control mechanism in its position for effecting a lock-out of the automatic and overrunning clutches.

Fig. 6 is a detail sectional view of a portion of the manual control mechanism taken as indicated by the line 6—6 of Fig. 3.

Fig. 7 is a detail sectional view of a portion of the manual control mechanism taken as indicated by the line 7—7 of Fig. 4.

Fig. 8 is a detail sectional view taken as indicated by the line 8—8 of Fig. 6.

Fig. 9 is a transverse sectional elevational view taken approximately as indicated by the line 9—9 of Fig. 2.

Fig. 10 is a view similar to Fig. 9 but showing the automatic clutch in its engaged condition.

Fig. 11 is a sectional view through a portion of the overrunning clutch taken as indicated by line 11—11 of Fig. 2.

Referring to the drawings, I have illustrated my driving mechanism A interposed between a speed ratio changing transmission B and the driven shaft 13, the latter extending rearwardly to drive the rear wheels (not shown) of the motor car or vehicle in the usual well known manner, it being understood that I have elected to show my invention in association with a motor vehicle drive although my invention in its broader aspects is not necessarily limited thereto. Furthermore, my driving mechanism may be used to advantage at various other points in the line of general power transmission between the vehicle engine and the driven wheels, or between driving and driven means such as shafts of other types of devices.

The transmission B may be of any suitable type such as the conventional selector type operated in the well-known manner through usual selector controls whereby the various adjustments may be made to the transmission in order to provide the speed ratios in the line of drive through the transmission.

The power coming from the usual engine or other prime mover (not shown) which may be located forwardly of the transmission B drives the transmission from an engine drive shaft 14 and the power is taken from this transmission by a power driving means or shaft 15 piloted in the rearwardly extending portion of a transmission driven shaft 16.

The front wall of a housing or casing 16a carries a suitable bearing 16b in which is mounted the driving shaft 14, whereas another bearing 16c carried by a rearward extension of housing 16a is adapted to journal the driven shaft 16 therein.

A countershaft 16d is mounted to rotate on an arbor 16e supported at its ends by the walls of housing 16a, this countershaft being formed with a number of integral gears 16f, 16g, 16h, and 16i. Of these, the gear 16f is in constant mesh with a gear or pinion 16j, formed on the driving shaft 14, so that the countershaft 16d is continuously connected to and driven from this shaft 14 in the well known manner. The gear 16g is also continuously in mesh with a gear 16k which is rotatably mounted on the driven shaft 16 as will be readily understood.

A shiftable clutch 16m is drivingly connected to the driven shaft 16 and is adapted for forward and rearward clutching action with cooperating clutch members 16n and 16p respectively, members 16n and 16p being fixed to the gears 16j and 16k. A shifter groove 16q is formed on clutch 16m which receives a shift fork 16r. The fork 16r is connected to a shifter rod, as will presently be apparent, and is adapted by rearward movement of the vehicle operator to engage the clutch 16m and clutch member 16p to effect the second speed; whereas moving the fork forwardly engages the clutch 16m and clutch member 16n to provide the direct drive in a well known manner.

Gears 16h and 16i constitute the low speed and reverse gears respectively, and are adapted to drive a gear 16s which is splined to and slidable on the shaft 16, this gear 16s being directly engageable with the gear 16h. The gear 16s may be driven from the gear 16i through a reverse idler pinion 16t in the well known manner. Such sliding action is effected in the usual way by means of a shifter fork 16u which engages in a groove 16v in the body of the gear 16s, this fork being actuated by a shifter rod as will presently be apparent. Thus, upon forward movement of fork 16u, the gears 16h and 16s engage to provide the low speed drive; whereas rearward movement thereof engages the gears 16s and 16t to effect the reverse drive.

Drivingly connected to splines 17 formed on the forward portion of the driving shaft 15 between casings 16c and 19 of the transmission B and driving mechanism A respectively, is a collar 20 having an annular groove 21. A shifter fork 22 is adapted to engage the groove 21 to move the shaft 15 fore and aft.

The driven shaft 13 is provided with an enlarged forward extension 23 coaxial with the aligned axes of shafts 13 and 15 and surrounding the rear end of shaft 15 and while this enlarged portion may be formed integrally with shaft 13 such structure is preferably built up for convenience of manufacture and attached to the shaft 13, as by bolts or rivets 24.

Formed at the forward end of the extension 23, where planetary gearing is employed, is an internal gear 25 meshing with a plurality of circumferentially spaced planetary gears 26 mounted on axles 27 connected by a ring-like carrier 28. The carrier 28 is provided with a rearwardly extending driving member in the form of a cylindrical shell-like clutching portion 29 having a plurality of circumferentially spaced slots 30 adapted for clutching engagement with the centrifugal force operated clutching elements or pawls 31 for the overdrive as will be presently more apparent, the portion 29 bearing against a suitable face of extension 23 to prevent rearward movement.

The planetary gears 26 also mesh with a sun gear 32 freely surrounding shaft 15, the gear 32 being non-rotatably secured to the casing 19 as by bolts 33.

The extension 23 transmits a drive from driven shaft 13 to the internal gear 25 prior to the overdrive from the driving shaft 15 to the driven shaft 13 as will presently be more apparent. When the overdrive is established, with the engine driving the vehicle, the extension 23 transmits the drive from the internal gear 25 to the driven shaft 13.

A suitable bearing is provided for the extension 23 at the extreme forward portion of the mechanism A. An inwardly extending flange 34 is drivingly connected to the extension 23 and rotatably journaled on a bearing 35, this bearing being supported by the sun gear 32 and held against fore and aft movement respectively by a snap-ring 36 carried by the gear 32 and the carrier 28. The flange 34 may, if desired, be formed integral with the extension 23 or may be provided, as shown, with external teeth to mesh with internal teeth on the extension 23 and held against forward and rearward movement by a snap-ring 37 and an abutment 38 on extension 23 respectively. An aperture 39 may be provided in the flange 34 to insure proper lubrication of the planetary gear train.

A pawl cage 41, carrying one or more pawls 31 of an automatic clutch C, is drivingly connected to splines 40 on the rearward portion of the driving shaft 15 just rearwardly of the carrier 28 and is locked against fore and aft movement relative to shaft 15 by snap-rings 43 and 44 respectively.

This automatic clutch may be of the type, best shown in Figs. 9 and 10, wherein the pawls 31 are yieldingly urged inwardly to their disengaged or declutched positions by springs 45. If desired, each pawl may be provided with a spring actuated ball detent 46 releasably engaging either of recesses 47 or 48 to assist in holding the pawls in stabilized condition and to prevent hunting prior to their release for outward and inward clutching movement respectively. At a predetermined desired speed of rotation of the pawls, centrifugal force will cause outward movement of the pawls, overcoming the action of springs 45, whereby the pawls will be projected for engaged or clutched positions. Each pawl 31 may have a yoke portion 49 extending substantially around shaft 15 and terminating in a counterbalancing guide and portion 50 substantially diametrically opposite a clutching end portion 51 of each pawl.

The shell 29 has the aforesaid plurality of circumferentially spaced pawl receiving slots or openings 30 suitably spaced so that diametrically arranged pairs of slots will simultaneously register with the pawls 31 so as to receive said pawls under conditions hereinafter more apparent.

The cage 41 is shiftable and is provided with a rearwardly extending externally toothed clutch member 52. An overrunning clutch D is mounted rearwardly of cage 41 on shaft 15. A cylindrical member 53 is preferably formed as a part of the driven shaft 13 and receives rollers or cylinders 54, which are maintained in their properly spaced relationship by a spacer ring 55, and a driving cam member 56. The extension 23 has formed thereon an internally toothed clutch member 57 adapted for clutching engagement with the shiftable member 52.

The cam member 56 is drivingly connected to the splines 40 of the driving shaft 15 and has a rearwardly extending neck which is journaled in a suitable bearing 58 carried by the driven shaft 13. The rearward portion of shaft 13 is rotatably supported and positioned by a bearing 59 mounted on the casing 19, the usual speedometer drive being taken from shaft 13 by gearing 60 in a well known manner.

The planetary gear set, prior to overdrive, is thus adapted to rotate the slots 30 from and at a speed less than that of the driving shaft 15, whereas the pawls 31 are driven directly from and at the speed of the driving shaft 15 when the automatic clutch C is in its Fig. 2 position. With collar 20 positioned as shown, shaft 15 directly drives shaft 13 through the overrunning clutch D until, at or above the critical speed, the pawls 31 are projected outwardly for engagement with slots 30, and such engagement will occur when the slots and pawls are substantially synchronized. Synchronization is effected by decreasing the speed of the driving shaft, as by releasing the usual accelerator pedal and allowing the driven shaft 13 to overrun the driving shaft 15 by reason of the overrunning clutch D. After projection of pawls 31, while the drive is directly through the overrunning clutch, and during the overrunning action to attain synchronism, the clutching ends of the pawls "jump" the slots 30 so that the pawls cannot engage the slots until their speeds are substantially the same.

When the automatic clutch C engages for providing a two-way positive drive through the planetary gear train, the overrunning clutch D is ineffective and continues to be so until the pawls are retracted by reason of their rotation below the critical speed.

A novel means for shifting the collar 20 rearwardly has been provided, it being understood that other suitable control means may be used with my driving mechanism.

A low speed and reverse gear rail 63 is slideably mounted on the casing 16a preferably above the transmission B, best shown in Fig. 1, and adapted to be shifted fore and aft to effect low speed or reverse drive therethrough by selective positioning of a gear shift lever 64 in a well known conventional manner. Thus the shifter fork 16u is fixed to rail 63 and engages the groove 16v on the shiftable gear 16s to mesh the same with the low speed countershaft gear 16h or the reverse idler gear 16t.

A second and high speed rail 65 is also mounted on casing 16a and is adapted to be shifted forwardly and rearwardly to effect the direct or the second speed drive by selective positioning of the lever 64. It will be noted that the rail 63 is preferably formed longer than the second and the high speed rail 65.

To assist in maintaining the rail 63 in the position desired, a releasable detent 66 is carried by the casing 16a and adapted to register with a recess 67 formed on rail 63 as shown in Fig. 1, this being the neutral station of this rail. This detent 66 is also adapted to register with a recess 69 when the rail 63 is shifted forwardly to engage gears 16h and 16s for low speed drive. Upon rearward movement of rail 63 the detent 66 registers with a recess 68, gears 16s and 16t being engaged during said movement to provide the reverse drive.

Mounted on casing 16a parallel with the rails 63 and 65 and in close juxtaposition thereto is a fork rail 71. An arm 72 is mounted inside the casing 16a and pivotally connected to a shaft 73 extending rotatably therethrough, the other end of arm 72 engaging a slot 74 in rail 71. Fixed to the end of the rotatable shaft 73 outside casing 16a is a lever arm 75 having its lower portion in engagement with a suitable remote control, in my drawing a Bowden wire dash control, the details of which will be presently set forth.

When rails 63 and 71 are positioned for a "neutral" position during which the gear 16s is out of engagement, the rear ends of these rails are aligned transversely. The intermediate portions of rails 63 and 71 have aligned annular grooves 76 and 77 respectively formed thereon, these grooves being interconnected by a pawl interlock—in this case a ball 78. The rails 63 and 71 may each have an adjustable releasable detent to assist in maintaining a desirable retarding pressure thereon, such as shown in the illustrated embodiment in which a ball 79 in an aperture 80 of casing 16a acts on groove 77, the ball 79 being releasably held by a spring 81 adjustably backed by a bolt 82. A pawl 83 may be interposed in aperture 80 between the groove 76 and an annular groove 84 on rail 65 in alignment with grooves 76 and 77, a ball 85 in the aperture 80 acting on groove 84 and being releasably held by a spring 86 adjustably positioned by a bolt 87 therein.

A fork member 88 carrying the shifter fork 22 is slidable on the rearwardly extending portions of rails 63 and 71. A pivot pawl 89 carried by member 88, best shown in Fig. 6, which may be pivotally held thereto by a pin 90, is adapted to engage an incline-sided groove 91 in the rail 71 while its other end simultaneously bears against the rail 63.

Assuming the Bowden remote control is positioned as shown, if the rail 63 is shifted rearwardly to engage the gears 16s and 16t, as shown in Fig. 4, the pawl interlock 78 comes into action to hold the rail 71 stationary. During this movement a locking ring 92 fixed to rail 63 comes into contact with member 88 and continued movement of rail 63 causes the pivot pawl 89 to disengage itself from slot 91 and to engage a corresponding incline-sided groove 93 in rail 63, thereby causing the fork 22 to follow along with the reverse movement of this rail. The rail 63 is releasably maintained in the desired position of Fig. 4 by the detent 66 registering with recess 68, and it is very evident that when this rail is positioned as in Fig. 3 its neutral recess 67 is releasably engaged by the detent 66 and that upon forward movement of this rail by the vehicle driver to engage gears 16h and 16s for low speed drive the detent 66 will register with recess 69 to releasably hold the rail.

On the return movement of the rail 63 toward its neutral position of Fig. 3, the fork 22 is carried forwardly with the reverse rail 63 until the forward face of member 88 strikes a locking ring 94 carried by rail 71, this ring being positioned at 95 against the casing 16a. Continued movement of rail 63 forwardly causes the pivot pawl 89 to rock out of engagement with groove 93 of rail 63 and into locking engagement with groove 91 of rail 71, it being noted that when member 88 strikes the ring 94 the grooves 91 and 93 of the rails 71 and 63 respectively are aligned transversely with the laterally extending ends of the pivot pawl 89.

When the aforesaid Bowden remote control is actuated to move rail 71 rearwardly, assuming the reverse rail 63 is in its neutral position of Fig. 3, the pawl interlock 78 comes into action to hold the rail 63 stationary. During this movement the locking ring 94 urges member 88 rearwardly until the ball 79 is forced by spring 81 into an annular groove 96 in the rail 71 at which time the collar 20 is in its rearward or "lock-out" position.

Upon forward movement of the rail 71 through the Bowden remote control toward its neutral position of Fig. 3, the pawl interlock 78 holds the rail 63 stationary and the member 88 is carried forwardly with the rail 71 until the ring 94 strikes the stop 95 and the spring-actuated ball 79 simultaneously engages the groove 77.

The earlier mentioned remote control includes a Bowden wire 97, as diagrammatically illustrated, which extends forwardly from arm 75 for convenient manipulation by the vehicle driver, such position being indicated by the usual dash 98 which mounts a handle or knob 99 connected to the other end of the Bowden wire 97. The handle is adapted for movement by the hand of the vehicle driver, this handle being guided from its Fig. 1 position to a position in spaced relationship from dash 98, this latter position being determined by the registering of the spring-actuated ball 79 with the groove 96 in rail 71 as earlier described.

My control means is so arranged that when the knob 99 is pulled outwardly from the dash 98 to effect rearwardly movement of the rail 71 and thereby shift the collar 20 to its aft position, the reverse rail 63 may be shifted rearwardly in response to positioning of the gear shift lever 64 for the reverse drive through the driving mechanism without disturbing the member 88 carrying fork 22. Thus, upon rearward movement of rail 71 the spring-actuated ball 79 engages groove 96 to hold rail 71 stationary until the rail 63 is again returned to its neutral position of Fig. 5.

Upon movement of either of rails 63 and 65, the pawl 83 comes into action to hold one of these rails stationary through their respective grooves 76 and 84. Thereby one of rails 63 and 65 is held stationary until the other is returned to its neutral position of Fig. 3. If desired, the rail 65 may be provided with a groove or recess on either side of the ball detent 85 to register therewith. Thus, a recess 100 may be used to hold rail 65 stationary when the transmission B is set for second speed, while a recess 101 may be used to hold this rail stationary when the transmission is in direct drive.

With reference to the operation of my driving mechanism and control system, when the parts are positioned as illustrated in Figs. 1 and 2, the driving shaft 15 drives the driven shaft 13 through the members 56 and 54 of the overrunning clutch D. However, when the automatic clutch C is engaged, by momentarily slowing down the speed of the driving shaft to synchronize the speeds of the slots 30 and pawls 31, the drive between the driving shaft 15 and the driven shaft 13 will be accomplished with an overdrive action or increase in speed of the driven shaft over the driving shaft through automatic clutch C, shell 29, planet gears 26, annulus gear 25, and extension 23.

When the collar 20 is shifted rearwardly by the earlier described Bowden remote control or reverse control, the clutch members 52 and 57 engage and the pawls 31 are shifted out of registration with slots 30. Therewith the automatic clutch C and the overrunning clutch D are simultaneously rendered inoperative and a two-way direct drive is established between shafts 15 and 13 through the intermediary of clutch members 52 and 57.

When the automatic clutch C is engaged for the overdrive, it is impossible to shift the collar 20 rearwardly or to the right of the position shown to attempt lock-out of the overrunning and automatic clutches for a direct drive, as the pawls 31 will be engaged with slots 30 of the shell 29.

My mechanism thus provides safety controls protecting the teeth of clutch members 52 and 57 when the overdrive is engaged; also protecting the pawls and slots, and preventing their "ratcheting" action when driving directly through members 52 and 57 above the critical speed of the automatic clutch.

By reason of my invention, the alignment of the various shafts and rotatable assemblies is made more accurate, easier to manufacture and less costly. For example, one further feature of my invention resides in the provision of the support for the forward end of the cylindrical member 53, or pineapple of the overrunning clutch D, at the extreme end of the driving mechanism A, being centered therein by sun gear 32 independently of shaft 15, the latter having a two-point bearing support in casing 16a and at 58.

As a further feature of my invention, I have provided bearing 58 for the free wheeling cam 56 which is also a bearing for a shift shaft, in this case driving shaft 15 thereby effecting a saving in cost and weight. Particularly, in this embodiment, the rear support for the cylindrical member of the overrunning clutch is at the rear of the driving mechanism while the front support therefor is at the extreme front of the mechanism, allowing the cylindrical member to straddle the moving parts.

As another feature of my invention, I have provided a novel, inexpensive, and efficient control system for power driving mechanisms whereby improper controlling with either or both the gear shift lever of the transmission or the remote control for the overdrive mechanism A is positively prevented, thus permitting the mechanisms to operate with increased quietness and long life. Furthermore, my control system is positive in operation and does not require any resilient means such as springs to return the shiftable members from the lock-out positions for establishing a direct drive through the overdrive mechanism.

I do not limit my invention, in the broader aspects thereof, to any particular combination and arrangement of parts such as shown and described for illustrative purposes since various modifications will be apparent from the teachings of my invention and scope thereof as defined in the appended claims.

I claim:

1. In a motor vehicle power transmission, a driving shaft, a driven shaft axially aligned with said driving shaft, an axially shiftable shaft intermediate said driving and driven shafts and having a splined connection with said driving shaft, said driven shaft having an outer overrunning clutch member carried therewith, an inner overrunning clutch member having splined connection with said intermediate shaft, means including a gear train operable to drivingly connect said intermediate shaft with said outer overrunning clutch member for driving said driven shaft from said driving shaft around said inner overrunning clutch member, a bearing for journalling said driven shaft on said inner member, clutch teeth drivingly connected to said intermediate and driven shafts, and means for shifting said intermediate shaft axially thereof to engage said teeth and thereby establish a drive between said driving and driven shafts independently of the drive through said gear train driving means.

2. In a motor vehicle power transmission, a driving shaft adapted for rotation in a forwardly driving direction or in a reverse direction, an overrunning clutch operable between said shafts for transmitting a one-way drive from said driving shaft to said driven shaft, clutching means for connecting said shafts for a two-way drive and including a clutch device drivingly connected to one of said shafts and adapted for shifting movement from a position of clutch release to a second position establishing a driving clutching connection with the other of said shafts, manually controlled operating means for establishing said reverse rotation of said driving shaft and including a shiftable reverse rail, a second rail mounted for shifting movement, an actuator for said clutch device adapted for selective operating connection with said rails, means for manually shifting said second rail, and means for automatically selectively connecting said actuator with said rails in response to shifting movements of said rails.

3. In a motor vehicle power transmission, a driving shaft adapted for rotation in a forwardly driving direction or in a reverse direction, an overrunning clutch operable between said shafts for transmitting a one-way drive from said driving shaft to said driven shaft, clutching means for connecting said shafts for a two-way drive and including a clutch device drivingly connected to one of said shafts and adapted for shifting movement from a position of clutch release to a second position establishing a driving clutching connection with the other of said shafts, manually controlled operating means for establishing said reverse rotation of said driving shaft and including a shiftable reverse rail, a second rail mounted for shifting movement, an actuator for said clutch device adapted for selective operating connection with said rails, means for manually shifting said second rail, and latching means for positively connecting said actuator selectively with said rails in response to shifting movements thereof.

4. In a motor vehicle power transmission, a driving shaft adapted for rotation in a forwardly driving direction or in a reverse direction, an overrunning clutch operable between said shafts for transmitting a one-way drive from said driving shaft to said driven shaft, clutching means for connecting said shafts for a two-way drive and including a clutch device drivingly connected to one of said shafts and adapted for shifting movement from a position of clutch release to a second position establishing a driving clutching connection with the other of said shafts, manually controlled operating means for establishing said reverse rotation of said driving shaft and including a shiftable reverse rail, a second rail mounted for shifting movement, an actuator for said clutch device adapted for selective operating connection with said rails, means for manually shifting said second rail, latching means providing a releasable positive connection between said actuator and one of said rails, and means acting in response to shifting movement of the other of said rails for causing said latching means to release said positive connection and establish a releasable positive connection between said actuator and said other rail.

5. In a motor vehicle power transmission, a driving shaft adapted for rotation in a forwardly driving direction or in a reverse direction, an overrunning clutch operable between said shafts for transmitting a one-way drive from said driving shaft to said driven shaft, clutching means for connecting said shafts for a two-way drive and including a clutch device drivingly connected to one of said shafts and adapted for shifting movement from a position of clutch release to a second position establishing a driving clutching connection with the other of said shafts, manually controlled operating means for establishing said reverse rotation of said driving shaft and including a shiftable reverse rail, a second rail mounted for shifting movement, an actuator for said clutch device adapted for selective operating connection with said rails, means for manually shifting said second rail, latching means releasably connecting said actuator with said second rail for establishing a positive operating connection between said second rail and said clutch device for positive shifting of said clutch device by said manually shifting means from said position of clutch release to said position of clutching connection and vice versa, and means acting in response to shifting of said reverse rail for causing said latching means to release said positive operating connection and establish a releasable positive connection between said actuator and said second rail for positive shifting of said clutch device by said manually controlled operating means from said position of clutch release to said position of clutching connection and vice versa.

6. In a motor vehicle power transmission, a power driving shaft, a driven shaft, an intermediate shaft, speed ratio changing mechanism between said driving and intermediate shafts for driving the intermediate shaft from the driving shaft selectively in forward and in reverse directions of rotation, manually operable means for selectively controlling said forward and reverse drives, overrunning clutch means operable between said intermediate and driven shafts, clutching means for connecting said intermediate and driven shafts for a two-way drive therebetween and including a clutch device drivingly connected to one of the last two said shafts and adapted for shifting movement from a position of clutch release to a second position establishing a driving clutching connection with the other of the last two said shafts, additional manually operable means, means operable in response to selective operation of each of said manually operable means for positively shifting said clutch device from said released position to said clutching position and vice versa, and clutch controlled means operable to drivingly connect said intermediate and driven shafts for driving said driven shaft from said intermediate shaft at a speed differing therefrom independently of the drive through said overrunning clutch means and independently of said two-way drive, the last said driving means including additional clutch means for controlling the drive therethrough, said additional clutch means being operable to establish said different speed drive only when said clutch device is in its said released position.

7. In a motor vehicle power transmission, a power driving shaft, a driven shaft, an intermediate shaft, speed ratio changing mechanism between said driving and intermediate shafts for driving the intermediate shaft from the driving shaft selectively in forward and in reverse directions of rotation, manually operable means for selectively controlling said forward and reverse drives, overrunning clutch means operable between said intermediate and driven shafts, clutching means for connecting said intermediate and driven shafts for a two-way drive therebetween and including a clutch device drivingly connected to one of the last two said shafts and adapted for shifting movement from a position of clutch release to a second position establishing a driving clutching connection with the other of the last two said shafts, additional manually operable means, an element operably connected to said clutch device and adapted for reciprocation for effecting shifting movements of said clutch device between its said positions, operating mechanism between said element and each of said manually operable means, and means providing positive reciprocating connection between said element and each of said operating mechanisms in response to selective actuation of each of said manually operable means.

8. In a motor vehicle power transmission, aligned shafts, overrunning clutch means between said shafts, clutching means operable to couple said shafts for a two-way drive therebetween, a reciprocatory element connected to operate said clutching means, a plurality of selectively operable manually actuating means, latching means connecting one of said plurality of actuating means with said element for positively reciprocating said element, and means acting in response to manual operation of the other of said actuating means for effecting release of said latching means with the first said actuating means and connection thereof with the second said actuating means for positively reciprocating said element.

EDWIN R. MAURER.